United States Patent
Loeven, II et al.

(10) Patent No.: US 8,151,740 B2
(45) Date of Patent: Apr. 10, 2012

(54) SYSTEM AND METHOD FOR CONTROLLING THE CALORIE CONTENT OF A FUEL

(75) Inventors: Robert Joseph Loeven, II, Simpsonville, SC (US); Fabien Thibault Codron, Simpsonville, SC (US); Michael John Mariani, Greer, SC (US)

(73) Assignee: General Electric Company, Schenectady, NY (US)

( * ) Notice: Subject to any disclaimer, the term of this patent is extended or adjusted under 35 U.S.C. 154(b) by 500 days.

(21) Appl. No.: 12/476,502

(22) Filed: Jun. 2, 2009

(65) Prior Publication Data

US 2010/0304316 A1 Dec. 2, 2010

(51) Int. Cl.
*F02B 43/00* (2006.01)
(52) U.S. Cl. .......................................... 123/1 A; 431/12
(58) Field of Classification Search ................... 123/1 A; 431/12, 75, 89
See application file for complete search history.

(56) References Cited

U.S. PATENT DOCUMENTS

| | | | | |
|---|---|---|---|---|
| 2,738,262 A * | 3/1956 | Benz et al. | ................... | 48/127.1 |
| 4,040,395 A * | 8/1977 | Demetrescu | ................... | 123/481 |
| 4,134,301 A * | 1/1979 | Erwin, Jr. | ................... | 73/453 |
| 4,161,164 A * | 7/1979 | Muhlberg | ................... | 123/551 |
| 4,749,122 A * | 6/1988 | Shriver et al. | ................... | 236/14 |
| 4,861,369 A * | 8/1989 | von Bogdandy et al. | ....... | 75/492 |
| 5,281,129 A * | 1/1994 | Urushidani et al. | ............ | 431/12 |
| 5,996,337 A * | 12/1999 | Blosser et al. | ................... | 60/274 |
| 7,396,228 B2 * | 7/2008 | Tanabe et al. | ................... | 431/12 |
| 2005/0092295 A1 * | 5/2005 | Hoshino et al. | ............... | 123/399 |
| 2006/0248894 A1 * | 11/2006 | Hiramoto et al. | ............... | 60/772 |
| 2007/0215127 A1 * | 9/2007 | Dearth et al. | ............ | 123/568.15 |

* cited by examiner

*Primary Examiner* — Noah Kamen
*Assistant Examiner* — Long T Tran
(74) *Attorney, Agent, or Firm* — Dority & Manning, P.A.

(57) ABSTRACT

A system and method for providing fuel mixes a first fuel with a second fuel at a mixing point to create a mixed fuel having a first calorie content. A control valve is located upstream of the mixing point. A process system downstream of the mixing point processes the mixed fuel to create a processed mixed fuel having a second calorie content. A first control signal is reflective of the first calorie content of the mixed fuel. A second control signal is reflective of the second calorie content of the processed mixed fuel. A third control signal is reflective of the operating level of the combustion engine. A controller connected to the control valve operates the control valve based on the first, second, and third control signals.

21 Claims, 2 Drawing Sheets

SYSTEM AND METHOD FOR CONTROLLING THE CALORIE CONTENT OF A FUEL

FIELD OF THE INVENTION

The present invention generally involves a system and method for controlling the calorie content of a fuel. More particularly, the present invention combines multiple fuels having different calorie contents to produce a processed mixed fuel having a desired calorie content.

BACKGROUND

Combustion engines rely on a stable fuel supply to initiate and maintain a desired combustion rate. For example, combustors on a gas turbine ignite fuel to generate combustion gases having a high temperature, pressure, and velocity. A fuel injection system supplies fuel to the combustors for ignition by a flame. At low power levels, the fuel injection system must provide fuel with a relatively high calorie content to maintain the combustion and avoid "blow out" of the flame. Conversely, "blow out" is less of a concern at high power levels, and fuel with a lower calorie content is more economical.

Possible fuels used by commercial combustion engines include blast furnace gas, coke oven gas, natural gas, and propane. The calorie content varies between each of these fuels. In addition, the calorie content for any particular fuel may vary, depending on the source of the fuel and the physical characteristics of the particular fuel, such as the purity, temperature, and pressure. For example, blast furnace gas and coke oven gas are by-products from the combustion of coke in the iron and steel industry; whereas, natural gas and propane are processed from naturally occurring underground deposits of methane and petroleum. The calorie content of blast furnace gas, also known as converter or LD gas, can vary between 700 kCal/m$^3$ and 950 kCal/m$^3$. The calorie content of coke oven gas can vary between 3900 kCal/m$^3$ and 4400 kCal/m$^3$. The calorie content of natural gas and petroleum often exceeds 4100 kCal/m$^3$.

The unit cost of fuel generally increases as the calorie content of the fuel increases. Therefore, various systems and methods exist to reduce fuel costs by mixing less expensive, lower calorie content fuel with more expensive, higher calorie fuel to obtain a mixed fuel having a desired calorie content.

For example, U.S. Pat. No. 7,396,228 describes a fuel gas calorie control method and device that mixes multiple fuels having different calorie contents to obtain a mixed fuel having a desired calorie content. The system and method relies on the measured flow rate and measured calorie content of the constituent fuels to calculate and predict the resulting calorie content of the mixed fuel.

Various factors can effect the accuracy of the calculations used to predict the resulting calorie content of the mixed fuel. For example, an accurate flow measurement depends on the pressure of the supplied fuels, and the pressure of the supplied fuels may change over time. In addition, the constituent fuels are often supplied through large volume, low pressure piping, which further effects the accuracy of any flow measurement.

System processes may further change either the actual or desired calorie content of the mixed fuel. For example, the mixed fuel may be pressurized before introduction into the combustion engine, changing the calorie content of the mixed fuel. Moreover, the optimum or desired calorie content of the mixed fuel may change based on changes in the operating level of the combustion engine.

Therefore, the need exists for a fuel control system that does not rely on an accurate measurement of the constituent fuel flow to produce a mixed fuel having a desired calorie content. In addition, the need exists for a fuel control system that can adjust the calorie content of the mixed fuel to account for changes in the calorie content caused by subsequent processing of the mixed fuel after mixing. Lastly, the need exists for a fuel control system that can adjust the desired calorie content of the processed mixed fuel supplied to the combustion engine based on changes in the operating level of the combustion engine.

BRIEF DESCRIPTION OF THE INVENTION

Aspects and advantages of the invention are set forth below in the following description, or may be obvious from the description, or may be learned through practice of the invention.

One embodiment of the present invention is a system for providing fuel having a desired calorie content to a combustion engine over a range of operating levels. The system includes a first fuel supply pipe containing a first fuel. A second fuel supply pipe containing a second fuel connects to the first fuel supply pipe at a mixing point so that the first fuel mixes with the second fuel to create a mixed fuel having a first calorie content. A control valve is located in the second fuel supply pipe upstream of the mixing point. A process system downstream of the mixing point processes the mixed fuel to create a processed mixed fuel having a second calorie content. A first control signal is reflective of the first calorie content of the mixed fuel. A second control signal is reflective of the second calorie content of the processed mixed fuel. A third control signal is reflective of the operating level of the combustion engine. A controller connected to the control valve operates the control valve based on the first, second, and third control signals.

Another embodiment of the present invention is a system for providing fuel having a desired calorie content to a combustion engine over a range of operating levels. In this embodiment, the system includes a first fuel supply pipe containing a first fuel. A second fuel supply pipe containing a second fuel connects to the first fuel supply pipe at a mixing point so that the first fuel mixes with the second fuel to create a mixed fuel having a first calorie content. A control valve is located in the second fuel supply pipe upstream of the mixing point. A process system downstream of the mixing point processes the mixed fuel to create a processed mixed fuel having a second calorie content. A trim calorimeter downstream of the process system produces a trim control signal reflective of the second calorie content of the processed mixed fuel. A controller connected to the control valve adjusts the control valve based on the trim control signal from the trim calorimeter.

Another embodiment of the present invention is a method for providing fuel having a desired calorie content to a combustion engine over a range of operating levels. The method includes determining the desired calorie content of the fuel and mixing a first flow of fuel with a second flow of fuel to produce a mixed fuel having a first calorie content. The method further includes measuring the first calorie content of the mixed fuel and processing the mixed fuel to produce a processed mixed fuel having a second calorie content. The method also measures the second calorie content of the processed mixed fuel and adjusts the second flow of fuel based on the desired calorie content, the first calorie content of the mixed fuel, and the second calorie content of the processed mixed fuel.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION

Figure 1:
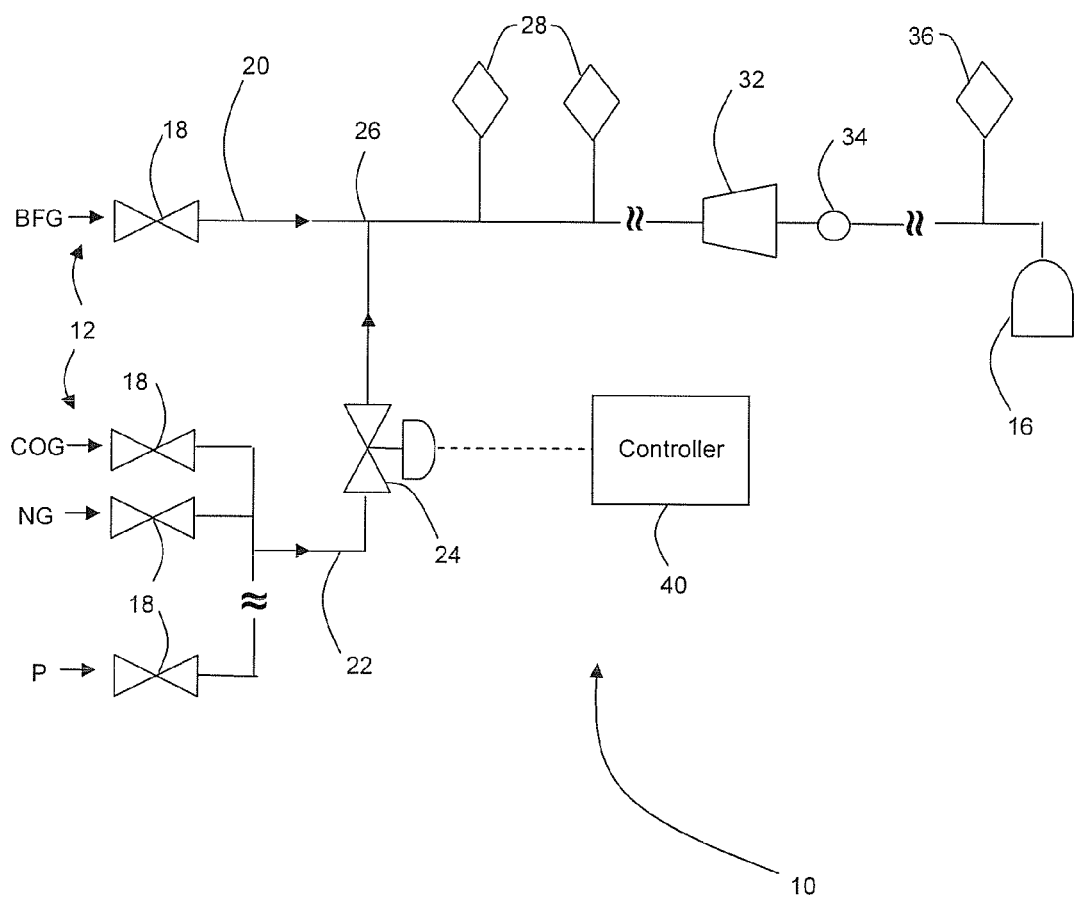
FIG. 1 is a simplified diagram of a fuel control system according to one embodiment of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

FIG. 1 provides a simplified diagram of a fuel control system 10 according to one embodiment of the present invention. As shown, the fuel control system 10 generally includes multiple fuel sources 12, piping 14 that connects the multiple fuel sources 12 to a combustion engine 16, and instrumentation and control equipment to combine the multiple fuel sources 12 in the necessary proportions to produce a fuel having a desired calorie content.

The multiple fuel sources 12 are shown on the left side of FIG. 1. The fuel sources may include any fuel that can be used by the combustion engine 16, such as blast furnace gas (BFG), coke oven gas (COG), natural gas (NG), and propane (P). Isolation valves 18 may be used to connect each fuel source to the piping 14. The use of isolation valves 18 allows a specific fuel source to be either selected for use or isolated from the fuel control system 10, depending on the availability of each fuel.

Each fuel source may be arranged according to the relative calorie content of the fuel. The less expensive and lower energy fuels (e.g., BFG) connect to the piping through a low energy supply line 20. The more expensive and higher energy fuels (e.g., COG, NG, and P) connect to a high energy supply line 22. The use of separate low 20 and high energy 22 supply lines allows the fuel control system 10 to select or receive multiple sources of both low and high energy fuels based on fuel availability.

The piping 14 that connects the multiple fuel sources 12 to the combustion engine 16 may be any manner of conduit, line, or transmission means for conveying fuel from a fuel source to a destination. The embodiment shown in FIG. 1 includes no flow measurement devices in the piping 14 that connects the multiple fuel sources 12 to the combustion engine 16; however, alternate embodiments may include such devices if desired.

A control valve 24 connects the high energy supply line 22 to the low energy supply line 20 at a mixing point 26 so that the higher energy fuel mixes with the lower energy fuel to produce a mixed fuel. The mixing point 26 may include any structure for combining the low and high energy fuels, such as a tank or simply the piping where the low and high energy supply lines meet. The control valve 24 may be a variable flow orifice, throttle valve, regulator valve, or any equivalent structure for regulating a variable flow. The control valve 24 is generally installed on the supply line that carries the higher pressure fuel, which is the high energy supply line in FIG. 1. The position of the control valve 24 thus determines the amount of higher energy fuel that is mixed with the lower energy fuel to change the calorie content of the mixed fuel. For example, opening the control valve 24 increases the amount of higher energy fuel added to the mixed fuel, thus raising the calorie content of the mixed fuel.

A mixed fuel sensor 28 may be located downstream of the mixing point 26 to sample the mixed fuel and provide a mixed fuel control signal 30 reflective of the calorie content of the mixed fuel. The mixed fuel sensor 28 may be located as close to the mixing point 26 as reasonably practicable to allow for prompt measurement of the mixed fuel and correspondingly faster responses to transient changes in fuel demand. In addition, the fuel control system 10 is relatively cleaner downstream of the mixing point, so locating the mixed fuel sensor 28 downstream of the mixing point 26 facilitates maintenance on the mixed fuel sensor 28.

The mixed fuel sensor 28 may be a high speed calorimeter, mass spectrometer, chromatograph, or any similar instrument capable of measuring the calorie content, hydrogen level, lower heating value (LHV), Wobbe index, or any other parameter of the mixed fuel to provide the mixed fuel control signal 30 reflective of the calorie content of the mixed fuel. In addition, multiple mixed fuel sensors 28 may be used to provide redundancy in the event an individual sensor fails. If multiple mixed fuel sensors 28 are used, additional circuitry 29 may be used to select the average, high, or low sensor to produce the mixed fuel control signal 30.

The mixed fuel typically passes through one or more system processes to produce processed mixed fuel before reaching the combustion engine 16. The system processes include any components that modify any physical characteristic or composition of the mixed fuel, such as a humidifier, dehumidifier, compressor, heat exchanger, and/or chemical addition station. As shown in FIG. 1, for example, the mixed fuel may pass through a compressor 32 and/or a heat exchanger 34 to regulate the pressure and/or temperature of the mixed fuel. Changes in the pressure and/or temperature of the mixed fuel produce corresponding changes in the calorie content of the processed mixed fuel on a volumetric basis. In addition, the addition or removal of noncombustible gases and liquid from the mixed fuel may also alter the calorie content of the processed mixed fuel on a volumetric basis.

A trim sensor 36 located downstream of the system processes samples the processed mixed fuel. The trim sensor 36 provides a trim control signal 38 reflective of the calorie content of the processed mixed fuel. The trim sensor 36 may be located as close to the combustion engine 16 as reasonably practicable to allow for measurement of the processed mixed fuel immediately before introduction into the combustion engine 16. The trim sensor 36 may be a high speed calorimeter, mass spectrometer, chromatograph, or any similar instrument capable of measuring the calorie content, hydrogen level, lower heating value (LHV), Wobbe index, or any other parameter of the processed mixed fuel to provide the trim control signal 38 reflective of the calorie content of the processed mixed fuel. In addition, multiple sensors may be used to provide redundancy in the event an individual sensor fails. If multiple sensors are used, additional circuitry may be used to select the average, high, or low sensor to produce the trim control signal 38.

Figure 2:
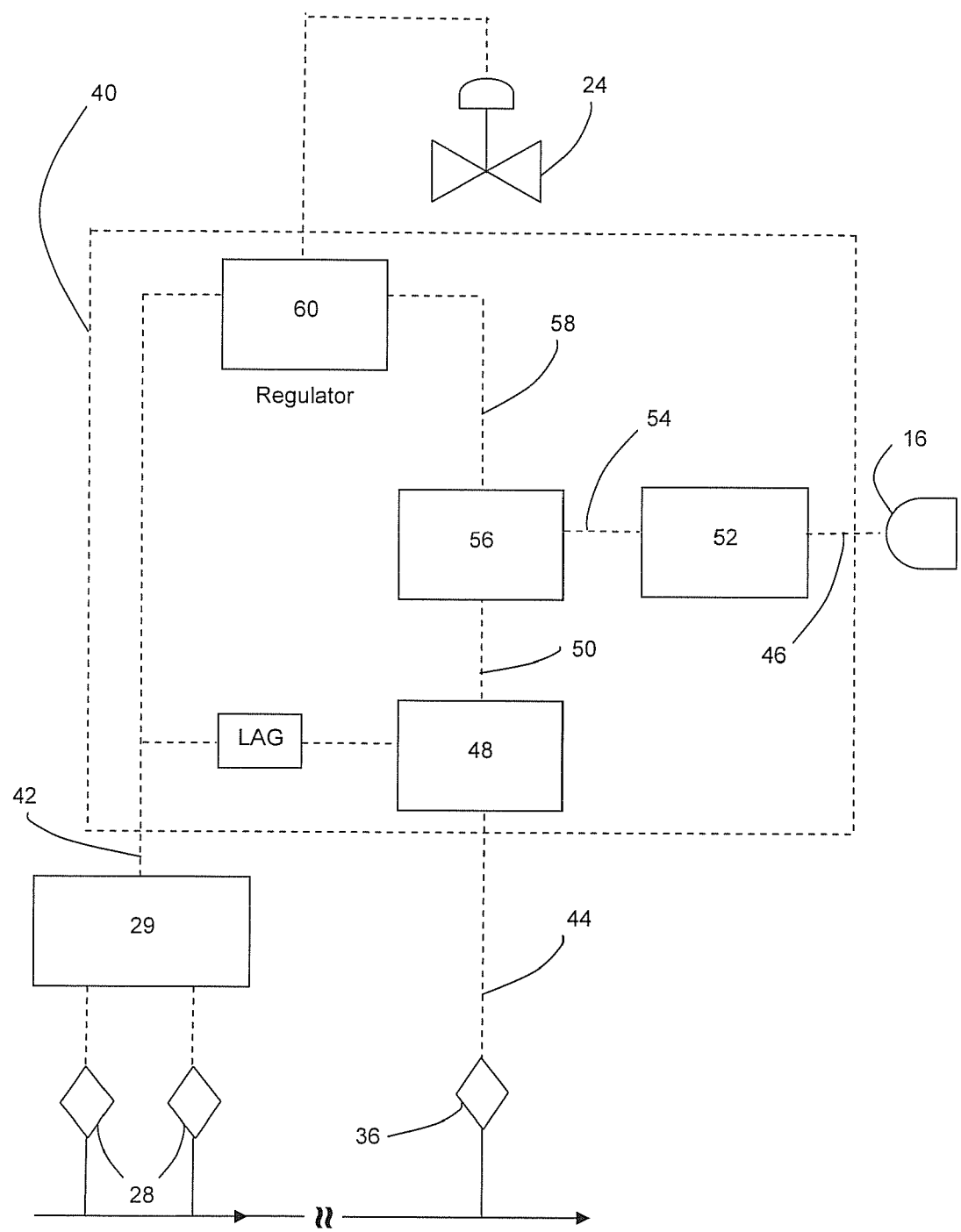
FIG. 2 is a block diagram of a fuel flow controller according to one embodiment of the present invention.

A controller 40 determines the position of the control valve 24. Many equivalent algorithms are possible to enable the controller 40 to accurately position the control valve 24 to produce the desired calorie content in the fuel. FIG. 2 provides a block diagram of one algorithm according to one embodiment of the present invention.

As shown in FIG. 2, the controller 40 may receive a first control signal 42 from the mixed fuel sensor 28, a second control signal 44 from the trim sensor 36, and a third control signal 46 from the combustion engine 16. The first control signal 42 from the mixed fuel sensor 28 may be the mixed fuel control signal 30 reflective of the calorie content of the mixed fuel. The second control signal 44 from the trim sensor 36 may be the trim control signal 38 reflective of the calorie content of the processed mixed fuel. The third control signal 46 from the combustion engine 16 may be reflective of the megawatt load, firing temperature, or other signal indicative of the operating level of the combustion engine 16.

At block 48, the controller 40 compares the first (mixed fuel) control signal 42 with the second (trim) control signal 44 to determine a trim value 50. The trim value 50 is the change in calorie content between the mixed fuel and the processed mixed fuel. The controller 40 may adjust the first (mixed fuel) control signal to account for the transport time for the mixed fuel to travel from the mixed fuel sensor 28 to the trim sensor 36, as shown by the LAG block in FIG. 2. This allows the controller 40 to more accurately compare the calorie content of the mixed fuel at the mixed fuel sensor 28 with the calorie content of that same mixed fuel after it has reached the trim sensor 36 as processed mixed fuel.

At block 52, the controller 40 determines the desired calorie content 54 based on the third control signal 46, which is reflective of the operating level of the combustion engine 16. For some embodiments, the desired calorie content 54 may remain constant over the range of operating levels for the combustion engine 16. For other embodiments, the desired calorie content 54 may change over the range of operating levels for the combustion engine 16, depending on particular design considerations.

At block 56, the controller 40 compares the desired calorie content 54 with the trim value 50 to determine an adjusted desired calorie content 58.

At block 60, the controller compares the adjusted calorie content 58 with the first (mixed fuel) control signal 42 to control the operation of the control valve 24. If the adjusted calorie content 58 is greater than the first (mixed fuel) control signal 42, the controller 40 opens the control valve 24 to increase the flow of high energy fuel thereby increasing the resulting calorie content of the fuel produced by the system 10. Conversely, if the adjusted calorie content 58 is less than the first (mixed fuel) control signal 42, the controller 40 closes the control valve 24 to decrease the flow of high energy fuel thereby decreasing the resulting calorie content of the fuel produced by the system 10.

It should be appreciated by those skilled in the art that modifications and variations can be made to the embodiments of the invention set forth herein without departing from the scope and spirit of the invention as set forth in the appended claims and their equivalents.

What is claimed is:

1. A system for providing fuel having a desired calorie content to a combustion engine over a range of operating levels, comprising:
   a. a first fuel supply pipe containing a first fuel;
   b. a second fuel supply pipe containing a second fuel and connected to the first fuel supply pipe at a mixing point so that the first fuel mixes with the second fuel to create a mixed fuel having a first calorie content;
   c. a control valve in the second fuel supply pipe upstream of the mixing point;
   d. a process system downstream of the mixing point for processing the mixed fuel to create a processed mixed fuel having a second calorie content;
   e. a first control signal reflective of the first calorie content of the mixed fuel;
   f. a second control signal reflective of the second calorie content of the processed mixed fuel;
   g. a third control signal reflective of the operating level of the combustion engine; and
   h. a controller connected to the control valve for operating the control valve based on the first, second, and third control signals.

2. The system of claim 1, further including a mixed fuel calorimeter downstream of the mixing point that generates the first control signal.

3. The system of claim 1, further including a trim calorimeter downstream of the process system that generates the second control signal.

4. The system of claim 3, wherein the trim calorimeter is proximate the combustion engine.

5. The system of claim 1, wherein the third control signal changes over the range of operating levels of the combustion engine.

6. The system of claim 1, wherein the desired calorie content decreases as the operating level of the combustion engine increases.

7. The system of claim 1, wherein the process system includes a compressor.

8. A system for providing fuel having a desired calorie content to a combustion engine over a range of operating levels, comprising:
   a. a first fuel supply pipe containing a first fuel;
   b. a second fuel supply pipe containing a second fuel and connected to the first fuel supply pipe at a mixing point so that the first fuel mixes with the second fuel to create a mixed fuel having a first calorie content;
   c. a control valve in the second fuel supply pipe upstream of the mixing point;
   d. a process system downstream of the mixing point for processing the mixed fuel to create a processed mixed fuel having a second calorie content;
   e. a trim calorimeter downstream of the process system that produces a trim control signal reflective of the second calorie content of the processed mixed fuel; and
   f. a controller connected to the control valve for adjusting the control valve based on the trim control signal from the trim calorimeter.

9. The system of claim 8, wherein the trim calorimeter is proximate the combustion engine.

10. The system of claim 8, further including a mixed fuel calorimeter downstream of the mixing point that generates a mixed fuel control signal reflective of the first calorie content of the mixed fuel.

11. The system of claim 10, wherein the controller adjusts the control valve based on the trim control signal and the mixed fuel control signal.

12. The system of claim 8, further including an operating level control signal reflective of the operating level of the combustion engine.

13. The system of claim 8, wherein the desired calorie content changes over of the range of operating levels of the combustion engine.

14. The system of claim 8, wherein the desired calorie content decreases as the operating level of the combustion engine increases.

15. The system of claim 8, wherein the process system includes a compressor.

16. A method for providing fuel having a desired calorie content to a combustion engine over a range of operating levels, the method comprising:
   a. determining the desired calorie content of the fuel;
   b. mixing a first flow of fuel with a second flow of fuel to produce a mixed fuel having a first calorie content;
   c. measuring the first calorie content of the mixed fuel;
   d. processing the mixed fuel to produce a processed mixed fuel having a second calorie content;
   e. measuring the second calorie content of the processed mixed fuel;
   f. adjusting the second flow of fuel based on the desired calorie content, the first calorie content of the mixed fuel, and the second calorie content of the processed mixed fuel.

17. The method as recited in claim 16, further including determining the desired calorie content based on the operating level of the combustion engine.

18. The method as recited in claim 16, further including changing the desired calorie content as the operating level of the combustion engine changes.

19. The method of claim 16, further including comparing the first calorie content of the mixed fuel with the second calorie content of the processed mixed fuel to determine a trim value.

20. The method of claim 19, further including adjusting the desired calorie content by the trim value to determine an adjusted desired calorie content.

21. The method of claim 20, further including adjusting the second flow of fuel based on the difference between the adjusted desired calorie content and the first calorie content of the mixed fuel.

* * * * *